United States Patent Office 3,380,854
Patented Apr. 30, 1968

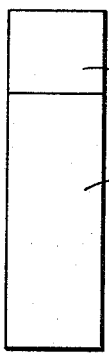
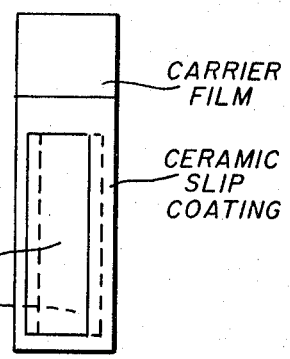
FIG. 1     FIG. 2
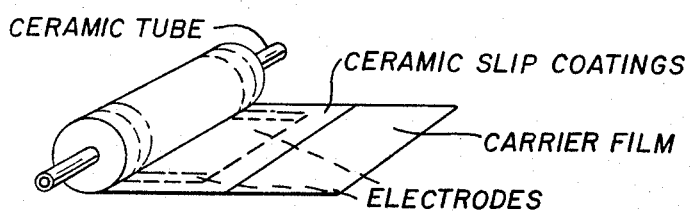
FIG. 3
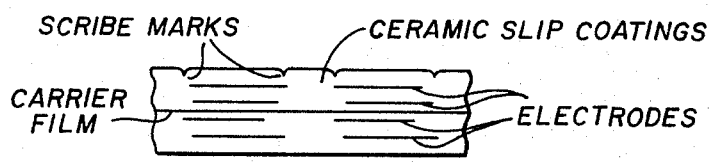
FIG. 4

3,380,854
METHOD OF MAKING CERAMIC CAPACITORS
Geoffrey Charles Robinson, Trenton, Ontario, Canada, assignor to Canadian Patents and Development Limited, Ottawa, Ontario, Canada, a Canadian company
Filed Nov. 27, 1963, Ser. No. 326,519
Claims priority, application Canada, Nov. 28, 1962, 863,321
16 Claims. (Cl. 117—217)

ABSTRACT OF THE DISCLOSURE

In the manufacture of ceramic capacitors by depositing alternating layers of ceramic slip and metallic electrode materials, an organic carrier film, e.g., of polyester, is employed as a temporary carrier so that the ceramic layers may be deposited by a simple dipping operation. The organic carrier film is finally burned away in the firing operation when the required number of ceramic and electrode layers have been deposited.

---

The present invention relates to a process for the production of ceramic capacitors of the type in which layers of ceramic dielectric separate layers of deposited metallic electrodes, the whole normally being covered with a further layer of ceramic as insulation and protection.

It is already known to produce ceramic capacitors by laying down a layer of ceramic slip upon a supporting surface or base, drying same, stripping the resultant ceramic film from the base, cutting the ceramic film to size, applying metallic electrodes and forming the metallized ceramic films into capacitor structures of the disc or coiled type and firing same to sinter the ceramic. The capacitors thus produced are generally satisfactory for their intended purposes, but the method of producing them suffers from the grave disadvantage that the stripping of the ceramic film from the base on which it is laid down, is a delicate operation and has a tendency to damage or destroy the ceramic layer. Furthermore, it is virtually impossible to make very thin ceramic films which are self-supporting unless extremely sophisticated apparatus is employed.

The present invention is based on the discovery that these disadvantages can be overcome by the use of an organic carrier film for the substrate or supporting surface on which the layers of initial ceramic slip and/or of electrode are laid down. This film makes the stripping of the ceramic from the support unnecessary and remains in the capacitor structure until the high temperature sintering operation, during which operation it volatilizes or burns out.

Satisfactory carrier films are those which are organic in nature and which volatize or burn away with little ash or residue at temperatures not higher than the intended firing temperature for the sintering of the ceramic. Desirable films are those which, in addition to having the above requirements, exhibit little or no heat distortion at the temperatures employed for the drying of the ceramic layers and for the drying of the electrode layers. Furthermore, satisfactory films must be substantially water impervious in view of the fact that the ceramic slip has an aqueous base. Water impervious films which volatilize or burn away substantially completely at temperatures below the normal ceramic firing temperatures include polyvinyl acetate, cellulose acetate, polyethylene and polyvinylidene chloride films. However, the preferred films are polyester films which are more resistant to heat distortion at the drying temperatures employed and in particular films of polyethylene terephthalate have been found highly satisfactory. Films of this material are commercially available under the trademark "Mylar."

The ceramic slips which are employed in the process of the invention are conventional materials consisting of one or more ceramic powders slurried in water and containing a film-forming agent such as polyvinyl alcohol together usually with a plasticizer, a deflocculent and a surface active agent. As ceramic powders there may for instance be employed barium, calcium, lead and/or strontium titanates with or without the addition of zirconates of the above mentioned metals and titanium dioxide. These produce ceramics of high dielectric constant generally desirable for high capacitance capacitors. For certain purposes ceramics of much lower dielectric constant may be desirable and typical of such materials are aluminum oxide and magnesium orthosilicate.

Metals which are satisfactory as electrodes for ceramic capacitors of this type may similarly be employed in the process of the present invention. For the ceramics based on titanates which demand a firing temperature of about 2100 to about 2600° F., metals which are highly resistant to oxidation at high temperatures must be employed. Noble metals generally possess the necessary qualities and particularly palladium and platinum. For the lower dielectric constant ceramics which generally can be fired at much lower temperatures, for instance as low as 1500° F., less oxidation resistant metals such as silver may be employed and naturally such a metal is considerably cheaper than palladium or platinum. Metal electrodes may be applied by coating the dried ceramic slip with a paste or dispersion of the finely divided metal. Such pastes are commercially available and usually have an organic solvent base. A suitable palladium paste for this purpose is marketed by E. I. du Pont de Nemours & Co. as palladium paste No. 6587. The metal dispersion may be applied to the ceramic surface in various ways, for instance, by the silk screen process and thereupon dried for a short time at an elevated temperature to remove the solvent. Furthermore, metal electrodes may be screened onto the substrate prior to the application of ceramic slip where desired.

The use of a carrier film in the process of the invention enables an advantageous modification of the prior process to be carried out. In prior art, individual layers of ceramic slip, after drying, were carefully removed from the support by means of a thin blade, the metal coating then applied, and pairs of such coated films superposed and formed into a capacitor for instance by rolling, and then fired. However, in the process of the present invention, the carrier film acting as a temporary substrate for the ceramic enables the structure to be handled much more readily. Accordingly, after the metal electrodes have been applied, the structure may be given a further ceramic coating laid down in the same manner as the first coating. Alternatively, an electrode layer can precede the application of any ceramic to the carrier film. After drying, this single sheet may then be rolled directly to form a tubular capacitor or may be cut or scored to subdivide it into sections which will form individual plate capacitors, depending on the capacitance desired and the allowable physical size for the finished capacitor. The presence of the carrier film as a temporary substrate during all the initial processing stages greatly facilitates handling and reduces chances of faults developing in the ceramic layers.

Furthermore, an additional important advantage of the invention is the doublet formation of dielectric layers. This arises because the two separate coatings of ceramic slip fuse together when the temporary substrate volatilizes or burns away during the firing operation, thus greatly reducing the probability of a weak point in the dielectric arising from the coincidence of weak points in each of the component layers of the doublet layer. Moreover, if a rolled capacitor is produced, the outermost ceramic layer on one side of the coated structure is brought into contact with the outermost ceramic layer on the other side of the structure, as more fully described hereinafter, and again there is the advantageous doublet formation of dielectric layers upon firing. The same doublet formation may easily be achieved in the production of multi-layer flat plate capacitors by laying down two ceramic layers overlying each electrode layer.

A more detailed description of the process of the invention is now given by way of illustration and with reference to the accompanying drawings, in which FIGURE 1 is a view showing one side of a strip of carrier film such as polyethylene terephthalate film dip coated over a substantial portion of its length with a ceramic slip;

FIGURE 2 is a view of a similar coated sheet bearing a metallic (e.g. palladium) coating as an electrode over a portion of the ceramic surface and bearing a similar electrode (indicated by dotted lines) on the reverse side thereof placed in partial overlapping relationship with the first electrode;

FIGURE 3 is a perspective view of a partially rolled ceramic capacitor prepared from a structure such as that shown in FIGURE 2 after coating the latter with a further layer of ceramic slip on each surface; and FIGURE 4 is a cross-sectional view of a capacitor structure intended for subsequent dicing into individual plate capacitors.

A typical ceramic slip for use in the process of the invention may be made by milling suitably blended ceramic powder (300 grams) with distilled water (180 ml.) and a small quantity of a deflocculent. After thorough milling at which time the viscosity is about 1500 centipoises, the suspension is allowed to stand for a minimum of two hours whereupon 2 ml. of an aqueous solution containing about 25% by weight of sodium heptadecyl sulphate is added with careful stirring. Then for each 100 grams of ceramic powder there is added 40 grams of a 10% solution of polyvinyl alcohol and 6 grams of triethanolamine. The mixture is then stirred carefully taking care not to allow the suspension to break and thus introduce air, until the whole is homogenous. It is then sieved through a pre-wetted 200 mesh sieve to remove air bubbles. The viscosity of the slip so prepared is in the range of 400–500 centipoises.

For the preparation of the ceramic coated film shown in FIGURE 1, a polyethylene terephthalate foil 1½ inches wide and 0.0005 inch thick is employed as a substrate, and brass rods 1½ inches long and ¼ inch in diameter are attached to each end of 15-inch lengths of the foil to keep the latter taut and free from wrinkles during the dipping process.

The carrier film so produced is then lowered into the ceramic slip at about 12 inches per minute and then withdrawn at the rate of 2 inches per minute and left suspended until the sheen has disappeared from the surface. The coated film is then dried in an oven at 125° C. for ½ to 1 hour.

A palladium paste (E. I. du Pont de Nemours No. 6587) is thinned with hydroxyethyl acetate to a suitable consistency and rectangular electrodes are deposited by the silk screen process on either side of the ceramic coated carrier film as shown in FIGURE 2. It will be noted that the electrodes are not completely superposed in order to ease the subsequent process of making electrical connections thereto. The palladium film is then dried by heating at 125° C. for a sufficient length of time not only to dry the palladium but also to render the polyvinyl alcohol in the ceramic slip relatively insoluble in water; 30 minutes is a typical period.

The electrode bearing film is then soaked in water at or somewhat above room temperature, preferably with agitation until bubbling of air entrapped by the ceramic has ceased, this usually taking about 15 seconds. The wetted strip is then allowed to drain in a high humidity chamber for at least 10 or 15 minutes to give the polyvinyl alcohol time to swell. The strip is then given a second dip in the ceramic slip to completely cover the electrodes, the dipping procedure being as described above. Thereupon the ceramic coating is dried under the same conditions as before.

After drying the strip is wound as tightly as possible on a tube about 3/16 inch in diameter, as shown in FIGURE 3. Suitable materials for this tube include green or fired ceramic if it is to remain in place, while metals such as steel may be used if these are later removed. The wound film is secured in place and the tubular structure so prepared is given an additional dip in the ceramic slip, dried and then fired at about 2450° F.

Finally, the ends are sawn off with a diamond-tipped wheel to expose the edge of one electrode at one end of the structure and the edge of the other electrode at the other end of the structure, and silver terminations are fired on, so completing the tubular capacitor.

In the manufacture of plate capacitors the main difference from the above procedure is that the palladium electrodes are screened on as a number of rectangular sections, for instance ½-inch by ⅝-inch, again on opposite sides of the ceramic coated foil and in partially overlapping relationship. If desired, after the second ceramic dip, further electrodes may be screened thereon and further ceramic coatings given until the desired number of pairs of electrodes have been built up. FIGURE 4 shows such a structure containing two pairs of electrodes partially superposed at each position. When the final layer of ceramic slip has been laid down, the structure is lightly scored or scribed on one surface thereof in such positions that subsequent dicing along the score marks will expose opposite edges of alternative electrodes to allow for subsequent electrical connections. After firing as above, the structure is broken or diced along the score marks and silver contacts fused on as described above.

Advantageously, the layers of ceramic overlying the electrodes of multi-layer flat plate capacitors may be formed as doublet layers similar in thickness and dielectric strength to the first formed layers laid down on the substrate. Thus, after the first electrodes have been screened on and covered by a layer of ceramic slip, the structure is given a water treatment as described and then a further dip in the ceramic slip before screening on further overlying electrodes. This procedure is repeated as necessary according to the number of electrode layers.

What I claim as my invention is:

1. In the process of making a ceramic capacitor by applying metallic coatings as electrodes to films of ceramic slip, forming the so produced metallized film structure into at least one capacitor unit, and firing the unit to sinter the ceramic, the steps which comprise:
    (a) applying a coating of a ceramic slip to both sides of an organic carrier film, said film being of a water-impervious material that is removable by the application of heat to leave substantially no residue at a temperature not exceeding the firing temperature of said slip,
    (b) heat treating said coated film to dry said ceramic coating,
    (c) depositing on each surface of said ceramic coating conductive metallic coatings as electrodes,
    (d) applying over at least a substantial part of the electrodes a further coating of ceramic slip,
    (e) forming the structure so produced into at least one capacitor unit, and
    (f) firing the unit to sinter the ceramic and remove said carrier film.

2. A process as claimed in claim 1 wherein the organic carrier film is a polyester film.

3. A process as claimed in claim 1 wherein, prior to step (d), the structure having the metallic coatings is treated with water to reduce bubble formation and increase wetting by the subsequently applied further coating of ceramic slip.

4. A process as claimed in claim 3 wherein said organic carrier film is a polyester film.

5. A process as claimed in claim 4 wherein the polyester is polyethylene terephthalate.

6. A process as claimed in claim 1 wherein said ceramic slip consists of a ceramic powder in an aqueous vehicle containing polyvinyl alcohol as a film-former and said heat treatment step (b) is conducted substantially to insolubilize the polyvinyl alcohol while avoiding appreciable heat distortion of the carrier film.

7. A process as claimed in claim 1 wherein palladium forms the electrodes.

8. A process as claimed in claim 1 wherein platinum forms the electrodes.

9. A process as claimed in claim 1 wherein, prior to step (e) and after step (d), the structure is dried, and wherein step (e) comprises spirally winding the structure into a cylindrical shape, applying a further coating of ceramic slip, and drying the so formed cylindrical unit.

10. A process as claimed in claim 1 wherein the application of the coating of ceramic slip in step (a) is conducted by dipping said film into an aqueous slurry of ceramic powder containing a film former.

11. A process of making a ceramic capacitor comprising the steps of:
  (i) applying a coating of a ceramic slip to both sides of an organic carrier film consisting essentially of polyethylene terephthalate,
  (ii) drying said coating by the application of heat,
  (iii) depositing on each surface of said ceramic coating, and partially covering same, metallic palladium electrodes by the application of a palladium paste and thereafter drying by the application of heat,
  (iv) treating the so formed structure with water until the ceramic surfaces are thoroughly wetted,
  (v) applying a further coating of ceramic slip to cover the electrodes completely,
  (vi) drying said coatings by the application of heat,
  (vii) forming the structure so produced into at least one capacitor unit,
  (viii) firing the capacitor unit to sinter the ceramic and remove the organic carrier film, and
  (ix) applying electrical connections to the electrodes.

12. A process as claimed in claim 11 wherein step (vii) comprises winding the structure into a tight coil, and wherein the coiled unit is then given a further coating of ceramic slip and dried.

13. A process as claimed in claim 11 wherein step (vii) comprises scribing the surface of said structure to subdivide same into sections capable of forming individual capacitor units and step (viii) is followed by breaking said structure along the scribed lines so forming individual capacitor units.

14. A process as claimed in claim 13 wherein steps (iv), (v) and (vi) are repeated before step (vii) to produce a double layer of ceramic between each electrode layer.

15. A process as claimed in claim 11 wherein electrodes are initially deposited on the organic carrier film prior to the first ceramic coating.

16. A process as claimed in claim 11 wherein the application of the coating of ceramic slip in step (i) is conducted by dipping said film into an aqueous slurry of ceramic powder containing a film former.

References Cited

UNITED STATES PATENTS

| | | | |
|---|---|---|---|
| 2,360,479 | 10/1944 | Detrick | 25—156 |
| 2,759,854 | 8/1956 | Kilby | 117—217 |

ALFRED L. LEAVITT, *Primary Examiner.*

C. K. WEIFFENBACH, E. B. LIPSCOMB,
*Assistant Examiners.*